United States Patent [19]

Ozeki

[11] 4,427,727
[45] Jan. 24, 1984

[54] SHEET FOR HOLDING TRANSPARENCIES

[75] Inventor: Jiro Ozeki, Tokyo, Japan

[73] Assignee: Slidex Corporation, Tokyo, Japan

[21] Appl. No.: 402,072

[22] Filed: Jul. 26, 1982

[30] Foreign Application Priority Data

Feb. 3, 1982 [JP] Japan .................................. 57-14716

[51] Int. Cl.³ .............................................. B65D 1/36
[52] U.S. Cl. ................................... 428/116; 206/456; 428/178
[58] Field of Search .................. 40/361, 374; 206/455, 206/456; 211/41; 248/473; 428/116, 178

[56] References Cited

U.S. PATENT DOCUMENTS

| | | | |
|---|---|---|---|
| 2,968,882 | 1/1961 | Ozeki | 206/456 X |
| 4,207,979 | 6/1980 | Brown | 206/456 |
| 4,207,980 | 6/1980 | Namiki | 206/456 |
| 4,236,635 | 12/1980 | Namiki | 206/456 |

Primary Examiner—Henry F. Epstein
Attorney, Agent, or Firm—Fleit, Jacobson, Cohn & Price

[57] ABSTRACT

The disclosed sheet has a plurality of rectangular recesses in rows and columns for holding one transparency in each recess, and an inclined surface portion is formed substantially at the center of the bottom wall of each rectangular recess, so that reflection from the center of the bottom wall of the recess is angularly deviated from reflection from the center of the transparency held by the recess.

6 Claims, 12 Drawing Figures

SHEET FOR HOLDING TRANSPARENCIES

BACKGROUND OF THE INVENTION

1. Field of the Invention

This invention relates to a sheet for holding transparencies, and more particularly to a transparency-holding sheet which is suitable for application to a projector having an automatic focussing device, so as to project clear images of transparencies such as slide films and microscopic preparations being held by the sheet.

2. Description of the Prior Art

Transparency-holding sheets have been used for classifying, storing, and projecting transparencies such as slide films. A typical transparency-holding sheet of the prior art consists of a transparent or translucent holder sheet, and a plurality of rectangular recesses are formed on the holder sheet so as to hold one transparency in each of such recesses. The bottom wall of each recess protects the emulsion layer of the transparency against scratching or other disturbances from the back of the holder sheet. However, the transparency-holding sheet of the prior art has a shortcoming in that, when the transparency held by such sheet is projected by a projector having an automatic focussing device, light beams reflected by the bottom wall of the recess proceed very close to the reflected light beams from the transparency and tend to cause an erroneous operation of the automatic focussing device. Accordingly, when the picture of the transparency carried by the transparency-holding sheet of the prior art is projected onto a screen by using the projector with the automatic focussing device, the picture projected on the screen is sometimes blurred due to the above-mentioned erroneous operation.

SUMMARY OF THE INVENTION

Therefore, an object of the present invention is to obviate the above-mentioned shortcoming of the prior art by providing an improved transparency-holding sheet, while maintaining the inherent advantages of the prior art.

To fulfill this object, a transparency-holding sheet of the invention uses a holder sheet with a plurality of rectangular recesses for holding one transparency in each of the recesses, and an inclined surface is formed substantially at the center of the bottom wall of each recess. Whereby, incident light beams reaching the inclined surface of the bottom wall of the recess through the transparency in the recess are reflected to a direction which is different from the direction of the light beams reflected by the surface of the transparency in the recess, so that interference between the reflected light beams from the bottom wall of the recess and the reflected light beams from the transparency surface is completely eliminated. Accordingly, false operation of an automatic focussing device due to the above-mentioned interference is fully eliminated, and one can project a clear picture of the transparency in good focus on the screen.

BRIEF DESCRIPTION OF THE DRAWINGS

For a better understanding of the invention, reference is made to the accompanying drawings, in which.

Throughout different views of the drawings, 1 is a holder sheet, 2 is a rectangular recess, 3 is an earpiece, 4 is a bottom wall, 5 is a film-supporting wall, 6 is a binder, 7 is a projector body, 8 is a light-transmitting diffusion plate, 9 is a condenser lens, 10 is an arm member, 11 is a projecting lens, 12 is a reflector, 13 is a stage, 14 is a slide film, 15 is an automatic focussing device, 16 is a light source, 17 is a condenser lens, 18 is a light-emitting cylinder, 19 is a condenser lens, 20 is a light-receiving element, 21 is a light-receiving cylinder, 31 is a holder sheet, 32 is a rectangular recess, 33 is a sidewall, 34 is an earpiece, 35 is a bottom wall, 36 is a sidewall, 37 is a film-supporting wall, 38 and 38a through 38f are inclined surfaces, 39 is a slide film, and 40 is a notch.

DESCRIPTION OF THE PREFERRED EMBODIMENTS

Figure 1:
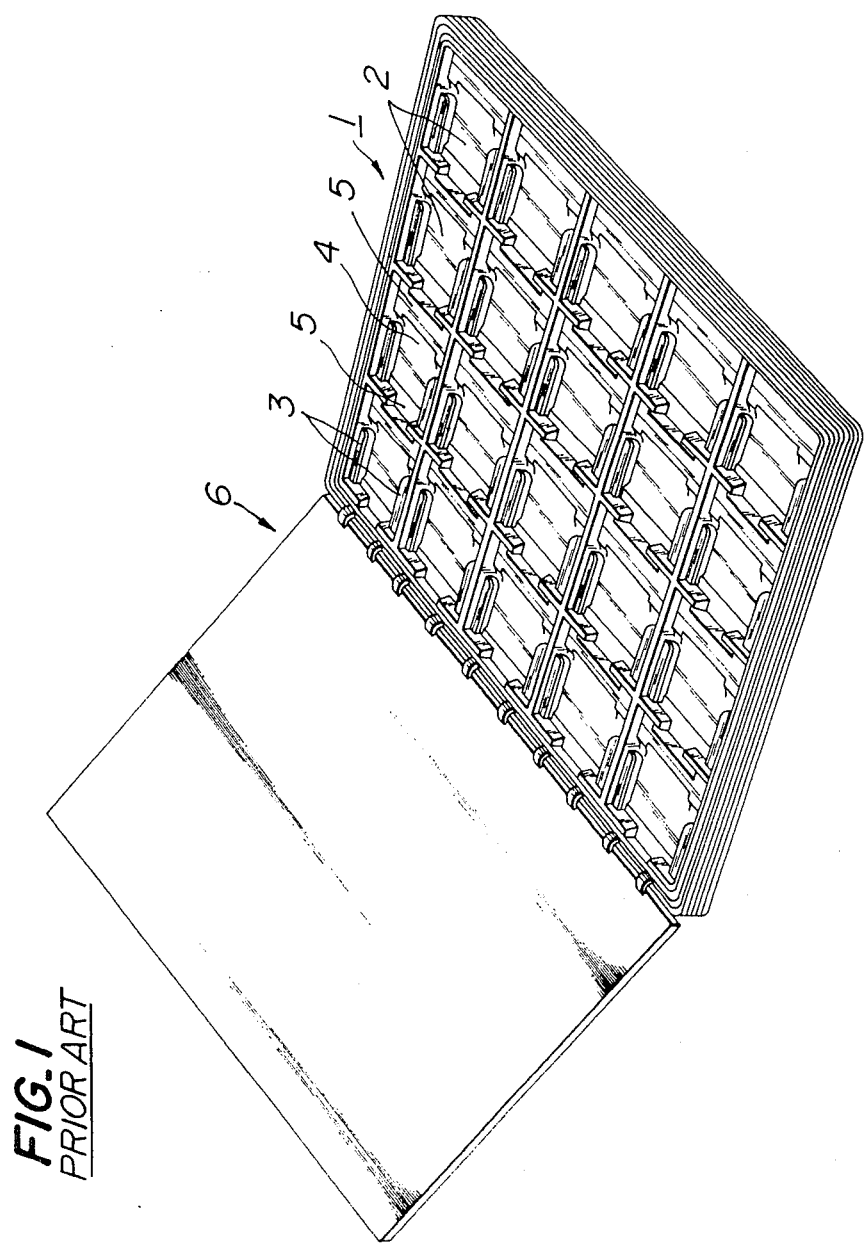
FIG. 1 is a perspective view of a holder sheet of the prior art.

Before entering the details of the invention, a typical transparency-holding sheet of the prior art will be briefly reviewed by referring to FIG. 1. In the figure, a holder sheet 1 is formed of a transparent or translucent plastics sheet and has a plurality of rectangular recesses 2 formed thereon in rows and columns. A pair of earpieces 3, 3 extend from opposing sidewalls of each recess 2 toward the inside thereof. Edge portions of the bottom wall 4 of each recess are raised toward the inside of the recess 2, so as to define film-supporting walls 5.

To insert a transparency such as a mounted slide film 14 (FIG. 2) into the recess 3, opposite edges of the mounted slide film 14 are at first placed under the earpieces 3, 3 and then mounted slide film 14 is pushed toward the inside of the recess 2 until the mounted film slide 14 rests on the film-supporting walls 5 and the earpieces 3, 3 urge the mounted slide film 14 against the film-supporting wall 5. Thus, the mounted slide film 14 is held in the recess 2 of the holder sheet 1.

The holder sheet 1 of FIG. 1 has filing holes bored along one edge thereof, so that a number of such holder sheets 2 are filed by a binder 6 through the filing holes. Accordingly, a large number of mounted slide films 14 can be easily classified and stored in an orderly and reliable fashion. When the mounted slide films 14 are thus held by the holder sheet 1 for classified storing, the photosensitive emulsion layer of each slide film 14 is separated from the bottom wall 4 of the recess 2 with a considerable spacing therebetween, and the bottom wall 4 protects the emulsion layer against scratching by foreign matters or other damages from the outside. When the holder sheet 1 is made of a translucent plastics sheet, the bottom wall 4 of each recess 2 thereof diffuses the light from the back of the holder sheet 1 and delivers the thus diffused light toward the surface thereof. Accordingly, one can see very clearly all the slide film 14 held by the holder sheet 1 at once simply by holding the holder sheet 1 against a suitable light source, for the sake of ready checking and easy retrieval of specific slide films 14.

Figure 2:
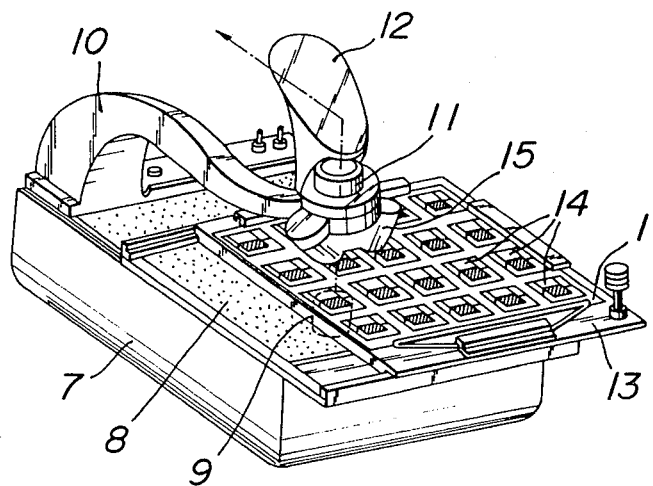
FIG. 2 is a perspective view of an overhead projector adapted to accept the holder sheet of FIG. 1.

However, the holder sheet 1 of the prior art has a shortcoming in that, when the slide film 14 is projected by an overhead projector without being removed from the holder sheet 1 as shown in FIG. 2, the holder sheet 1 tends to disturb accurate operation of an automatic focussing device of the projector. The projector of FIG. 2 has a projector body 7 with a light source system disposed therein, a light-transmitting diffusion plate 8 closing the top of the body 7, a condenser lens 9 extending through the diffusion plate 8, and an arm member 10 extending from the body 7 so as to keep a projecting lens 11 and a reflector 12 directly above the condenser 9 with a spacing therefrom. A stage 13 is held horizontally immediately above the condenser lens 9 but below the projecting lens 11 in such a manner that the stage 13 is movable along two orthogonal axes on a horizontal plane. The holder sheet 1 is detachably mounted on the stage 13. An automatic focussing device 15 is secured to the arm member 10 in alignment with the projection lens 11. The automatic focussing device 15 detects the vertical position of the slide film 14 inserted in the holder sheet 1 and moves the projecting lens 11 in the axial direction thereof for focussing. In the projector of FIG. 2, light beams from the light source thereof are converged by the condenser lens 9, and the converged light beams proceed through the slide film 14 so as to carry the image of the slide film 14 and further proceed to the thus moved projection lens 11, and the image-carrying light beams are focussed by the projecting lens 11 and then reflected by the reflector 12 for projection of the image on a screen (not shown).

Figure 3:
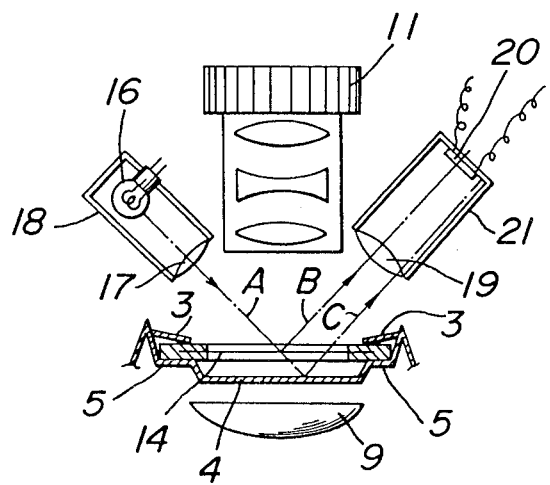
FIG. 3 is a schematic sectional view, showing the relationship between the optical system of an automatic focussing device and the holder sheet of the prior art.

FIG. 3 shows the optical system of the automatic focussing device 15 of the overhead projector. The optical system includes a light-emitting cylinder 18 enclosing a light source 16 and a condenser lens 17, and a light-receiving cylinder 21 enclosing a condenser lens 19 and a light-receiving element 20. The cylinders 18 and 21 are disposed on a vertical plane including the optical axis of the projecting lens 11, and they are inclined by about 45° on opposite sides of the optical axis of the projecting lens 11. When the automatic focussing device 15 is used for projection of the picture of the slide film 14 held by the holder sheet 1 of the prior art as shown in FIG. 1, a sharp light flux A emanating from the light-emitting cylinder 18 is mostly reflected at about the center of the slide film 14 and the thus reflected light beam B reaches the central portion of the light-receiving element 20 of the light-receiving cylinder 21 as shown in FIG. 3. Unless other light beams reach the light-receiving element 20, the reflected light beam B from the slide film 14 determines the output of the light-receiving element 20 and hence the position of the projecting lens 11. However, in the case of the holder sheet 1 of the prior art, a part of the light beam A passing through the slide film 14 is reflected by the flat bottom wall 4 of the recess 2 and the reflected light beam C from the bottom wall 4 reaches the light-receiving element 20, so as to cause an erroneous movement of the projecting lens 11. Consequently, the automatic focussing device 15 operates falsely and the sharpness of the projected picture on the screen is deteriorated.

The details of the optical system of the automatic focussing device 15 are known and beyond the scope of the present invention, so that FIG. 3 shows only those parts which relate to the basic principles of the present invention.

The invention eliminates the above-mentioned false operation of the automatic focussing device which has been experienced with the holder sheet of the prior art, while maintaining the inherent advantages of the holder sheet of the prior art.

Figure 4:
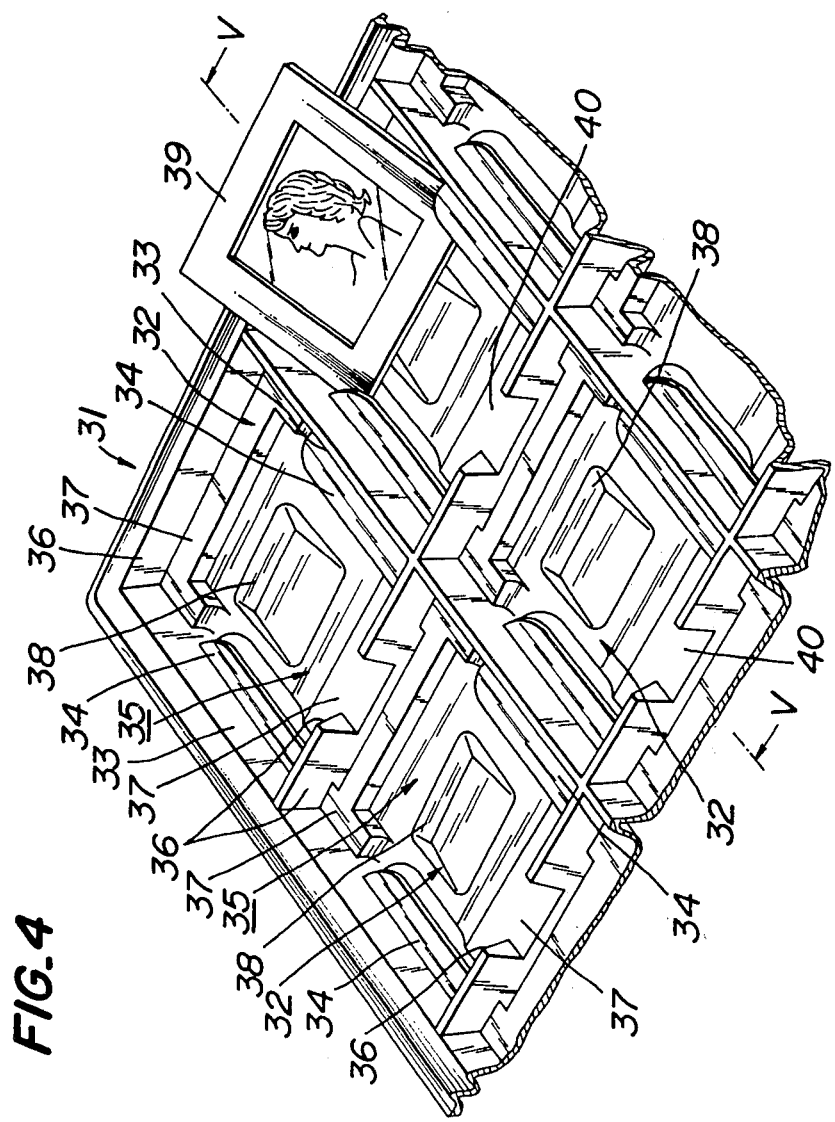
FIG. 4 is a fragmentary perspective view of an embodiment of the present invention on a large scale.
Figure 5:
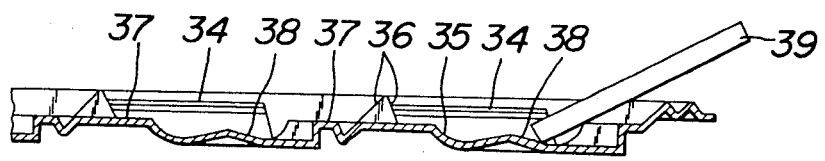
FIG. 5 is a sectional view taken along the line V—V of FIG. 4.

FIG. 4 shows an embodiment of the present invention, and FIG. 5 shows a sectional view thereof. A holder sheet 31 of the present invention can be made of transparent or translucent glass or plastics as in the case of the conventional holder sheet 1 of FIG. 1. A plurality of rectangular recesses 23 are formed on the holder sheet 31, which recesses 32 are aligned in rows and columns. A pair of earpieces 34 extend substantially horizontally from opposing sidewalls 33 of each recess 32 toward the inside of the recess 32. The earpieces 34 may be formed by cutting and bending a part of opposing sidewalls 36, which sidewalls 36 are perpendicular to both the above-mentioned sidewalls 33 and the bottom wall 35 of the recess 32. Instead, the earpieces 34 may be formed by cutting and bending a part of the sidewalls 33 from one ends to intermediate points thereof while severing the corresponding parts of the bottom wall 35.

Film-supporting walls 37 are formed by raising edge portions of the bottom wall 35 of the recess 32 into the inside of the recess 32. In the embodiment of FIG. 4, two film-supporting walls 37 are formed for each recess 32; namely, a channel-shaped film-supporting wall 37 formed along one sidewall 36 between the opposing sidewalls 33 so as to face the tips of the earpieces 34, and a linear film-supporting wall 37 formed along the other sidewall 36 between the feet of the earpieces 34. However, the shape and the size of the film-supporting walls 37 are not restricted to those of FIG. 4, and in fact they can be designed in suitable shape and size so as to support those portions of the slide film 14 above the bottom wall 35 which surround the picture-carrying central part of a mounted slide film 39.

In the embodiment of FIG. 4, an inclined surface 38 is formed at about the central portion of the bottom wall 35 of each recess 32 in such a manner that lower end of the inclined surface 38 extends toward the tip of the earpieces 34.

To insert the mounted slide film 39 into the recess 32 of the holder sheet 31, one end or the forward end of the mounted slide film 39 is placed under the earpieces 34 while holding the mounted slide film 39 in the width direction or thickness direction thereof by fingers, as shown in FIG. 5. Then, the opposite end or the rear end of the mounted slide film 39 is pushed by the fingers toward the inside of the recess 32, so that the forward end of the mounted slide film 39 proceeds over the inclined surface 38 and moves onto the film-supporting wall 37 at the feet of the earpieces 34, while causing elastic bending of the earpieces 34. At the same time, the rear end of the mounted slide film 39 comes to rest on the film-supporting wall 37 at the tips of the earpieces 34. Thus, the mounted slide film 39 is securely held between the film-supporting walls 37 and the earpiece 34 by the resiliency of the earpieces 34.

When the mounted slide film 39 is held in the holder sheet 31 in the above-mentioned manner, the bottom wall 35 with the inclined surface 38 for each recess 32 of the holder sheet 31 fulfils the same functions as those of the prior art; namely, the effective protection of the emulsion layers of the mounted slide films 39, and the illumination of the mounted slide films 39 for facilitating the viewing, checking, and retrieving thereof.

The mounted slide films 39 held by the holder sheet 31 can be easily removed from the holder sheet 31 by pushing the above-mentioned forward end of the mounted slide film 39 toward the rear end thereof with a finger at a notch 40 formed on the sidewall 36 on the feet side of the earpieces 34.

Figure 6:
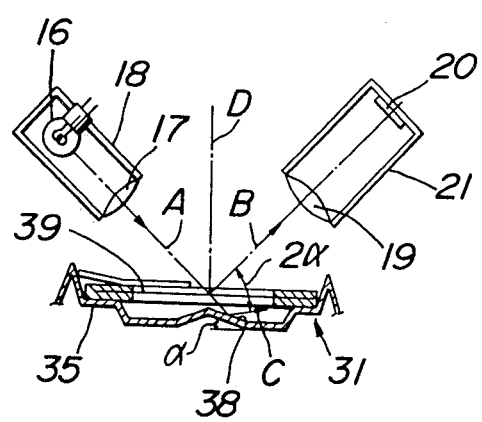
FIG. 6 is a schematic sectional view, showing the relationship between the optical system of the automatic focussing device and the holder sheet of the invention.

FIG. 6 schematically shows the relationship between the optical system of the above-mentioned automatic focussing device 15 and the mounted slide film 39 held by the holder sheet 31 of the invention. In the case of the holder sheet 31 of the invention, even if a part of the sharp light beam A from the light-emitting cylinder 18 passes through the mounted slide film 39, the light beam A is reflected by the inclined surface 38 of the bottom wall 35, so that the reflected light beam C from the inclined surface 38 does not reach the light-receiving element 20 of the light-receiving cylinder 21. More particularly, if the inclined surface 38 is formed at the central portion of the bottom wall 35 of the recess 32 with an angle $\alpha°$ relative to a horizontal plane, when a part of the light beam A passes through the mounted slide film 39 at the intersection thereof with the optical axis of the projecting lens 11 and is reflected by the inclined surface 38, the reflected light beam C from the inclined surface 38 is deflected by an angle $2\alpha°$ relative to the reflected light beam B from the mounted slide film 39. Accordingly, the thus deflected light beam C never enters into the light-receiving cylinder 21 and never reaches the light-receiving element 20 therein, so that the operation of the light-receiving element 20 is not affected by the reflected light beam C.

Consequently, the light-receiving element 20 receives only the reflected light beam B from the surface of the mounted slide film 39, and very accurate automatic focussing operation is ensured.

Figure 7:
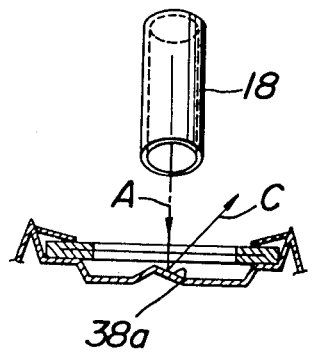
FIG. 7 is a schematic sectional view similar to FIG. 6 but taken from a different direction, showing the relationship between the optical system and another embodiment of the invention.

FIG. 7 shows a modification of the inclined surface of the invention. In this modification, an inclined surface 38a is turned in a direction perpendicular to the plane which includes both the light-emitting cylinder 18 and the light-receiving cylinder 21. Accordingly, the reflected light beam C from the inclined surface 38a is deflected by 90° from the plane which include both the incident light beam A and the reflected light beam B from the surface of the mounted slide film 39, so that the risk of having the reflected light beam C from the inclined surface 38a of the bottom wall 35 enter into the light-receiving cylinder 21 is completely eliminated.

When a combination of the inclined surface 38 of FIG. 6 and the modified inclined surface 38a of FIG. 7 is used, elimination of the adverse effects of the reflected light beam C from a point of the bottom wall 35 on the light-receiving element 20 is further ensured. In FIGS. 6 and 7, the flexing of the inclined surfaces 38 and 38a at the illustrated points of flexion is shown with some exaggeration, and if the inclined surface is connected to the base wall 35 through walls with a large radius of curvature, the flexed portions between the bottom wall 35 and the inclined surface 38 or 38a will not cause any adverse effects on the image projected on a screen.

Figure 8A:
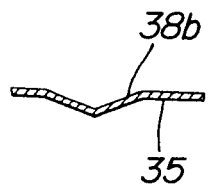
FIGS. 8A through 8E are fragmentary sectional views, showing various modifications of the inclined surface to be used in the present invention.
Figure 8B:
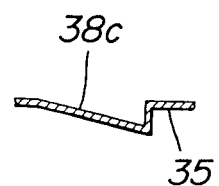
Figure 8C:
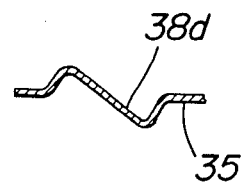
Figure 8D:
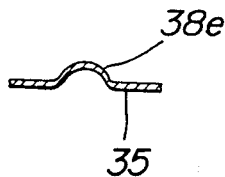
Figure 8E:
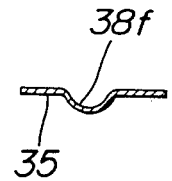

FIGS. 8A through 8E are fragmentary sectional views showing other modifications of the inclined surface of the invention. Inclined surfaces 38b and 38c of FIG. 8A and FIG. 8B extend outwardly relative to the inside space of the recess 32 of FIG. 4, or such surfaces 38b and 38c extend downward from the bottom wall 35 of FIG. 4. The inclined surface 38b of FIG. 8A is symmetrical relative to a vertical to the bottom wall 35 through the extended tip of the inclined surface 38b itself, while the inclined surface 38c of FIG. 8B is not symmetrical but includes a vertical wall portion. The inclined surfaces 38b and 38c are farther separated from the emulsion layer fixed on the mounted slide film 39 than the remaining portions of the bottom wall 35, so that the protection of the emulsion layer against damage from the outside is further improved. An inclined surface 38d of FIG. 8C extends both above and below the bottom wall 35, and this structure allows formation of a comparatively long inclined surface while using shallow contractions in the process of shaping the holder sheet 31. Inclined surfaces 38e and 38f of FIG. 8D and FIG. 8E are smoothly curved toward the inside and outside of the recess 32, so that such inclined surfaces 38e and 38f minimize the adverse effects on the image projected on the screen.

In the foregoing description, only the holder sheets for mounted slide films are referred to as examples, but the present invention applies also to other type holder sheets such as holder sheets transparent preparations for microscopes.

As described in the foregoing, according to the present invention, an inclined surface is formed at about the center of the bottom wall of each recess of a holder sheet, so that an incident light beam at such inclined surface is reflected to a direction which is different from the direction of a light beam reflected from a transparency held at the recess, so that the light-receiving cylinder of an automatic focussing device receives the reflected light beam from the transparency but not the reflected light beam from the inclined surface. Accordingly, adverse effects on a light-receiving element in the light-receiving cylinder by the reflected light beam from the bottom wall of the recess is completely eliminated, and accurate focussing is always ensured.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. A sheet for holding transparencies, comprising a holder sheet, a plurality of rectangular recesses depressed from said holder sheet in rows and columns, a pair of earpieces extending from opposing sidewalls of each of said recesses toward the inside of the recess, a transparency-supporting wall means spaced from the earpieces of each of said recesses and extending toward the inside of the recess, a bottom wall depressed from said transparency-supporting wall means to a rectangular form at the center portion of said recess, the improvement comprising an inclined surface portion formed substantially at the center of the bottom wall of each of said recesses with an angle to the bottom wall.

2. A sheet for holding transparencies as set forth in claim 1, wherein said inclined surface portion extends outward relative to the inside of said recess.

3. A sheet for holding transparencies as set forth in claim 1, wherein said inclined surface portion extends inward relative to the inside of said recess.

4. A sheet for holding transparencies as set forth in claim 1, wherein said inclined surface portion extends both inward and outward relative to the inside of said recess.

5. A sheet for holding transparencies as set forth in claim 1, wherein said inclined surface portion includes an inclined planar surface.

6. A sheet for holding transparencies as set forth in claim 1, wherein said inclined surface portion includes a smoothly curved surface.

* * * * *